United States Patent [19]

Rasmussen et al.

[11] Patent Number: 4,553,487
[45] Date of Patent: Nov. 19, 1985

[54] REMOVAL OF TRAMP MATERIAL FROM FLUID BED VESSELS

[75] Inventors: George P. Rasmussen; Earl S. Grimmett, both of Idaho Falls, Id.

[73] Assignee: Waste-Tech Services, Inc., Idaho Falls, Id.

[21] Appl. No.: 619,678

[22] Filed: Jun. 11, 1984

Related U.S. Application Data

[63] Continuation-in-part of Ser. No. 528,815, Sep. 2, 1983, abandoned.

[51] Int. Cl.⁴ ............................................. F23G 5/00
[52] U.S. Cl. ................................... 110/245; 110/257; 110/258; 110/263
[58] Field of Search .................. 110/165 R, 245, 248, 110/255, 257, 258, 263, 341, 342; 122/4 D; 126/152 B, 163 R; 431/7, 170

[56] References Cited

U.S. PATENT DOCUMENTS

| | | | |
|---|---|---|---|
| 3,625,164 | 12/1971 | Spector | 423/168 |
| 3,834,326 | 4/1973 | Sowards | |
| 3,877,397 | 4/1975 | Davies et al. | 34/57 A |
| 4,060,041 | 11/1977 | Sowards | 110/245 |
| 4,075,953 | 6/1977 | Sowards | 110/245 |
| 4,196,676 | 4/1980 | Brown et al. | 110/245 |
| 4,273,073 | 6/1981 | Robinson | 122/4 D |
| 4,279,222 | 7/1981 | Pearce | 110/263 |
| 4,308,807 | 1/1982 | Stokes | 110/257 |
| 4,384,535 | 5/1983 | McKelvie | 110/165 R |
| 4,419,940 | 12/1983 | Cosar et al. | 110/248 |
| 4,445,844 | 5/1984 | Matthews | 431/170 |
| 4,448,134 | 5/1984 | Foote | 110/245 |

FOREIGN PATENT DOCUMENTS 6216 1/1982 Japan .................. 110/245

OTHER PUBLICATIONS

Advances in Energy Productivity, 5th World Energy Engineering Congress, Sep. 14–17, 1982.

Primary Examiner—Albert J. Makay
Assistant Examiner—Steven E. Warner
Attorney, Agent, or Firm—Lynn G. Foster

[57] ABSTRACT

A system for removal of tramp or trash material from a single fluidized bed contained within a single vessel used to incinerate or pyrolyze solid fuel, the system comprises a gently sloped, skewed or serpentine stationary bed support and air distributor structure which distributes air in a fashion so as to uniformly fluidize a shallow bed of variable depth across the slope thereof without internally circulating the bed, and at the same time cause non-combustible tramp or trash material (e.g. pieces of steel, rocks, clumps, etc.), to be removed from the bed without passing to a location either above or beneath the bed. The angle of slope is strictly controlled. During periods of non-fluidization and/or non-use, the bed material is kept from falling into the air distribution plenum below the bed support structure by hollow bed containment structure disposed at sites below the bed support structure. Fluidizing air and gravity alone gently walk tramp material downwardly along the top of the bed support structure toward a discharge site. Although the discharge of fluidized air through the grid plate into the bed may be non-vertical, the horizontal component of said air discharge is immediately dissipated and the bed turbulence or direction of fluidization is essentially vertical. The sizing and spacing of air distributor holes may be varied in respect to any sloped grid plate to provide for proper and uniform fluidization across the bed having non-uniform depth without causing rotational mixing within the bed.

10 Claims, 12 Drawing Figures

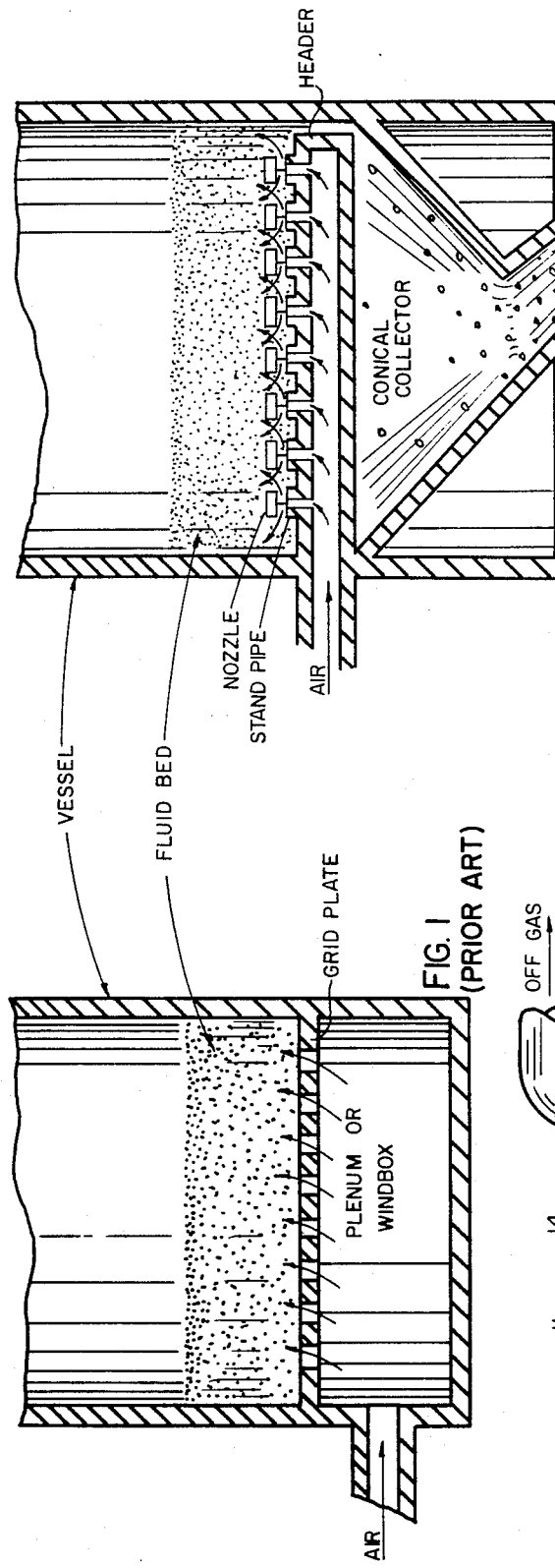
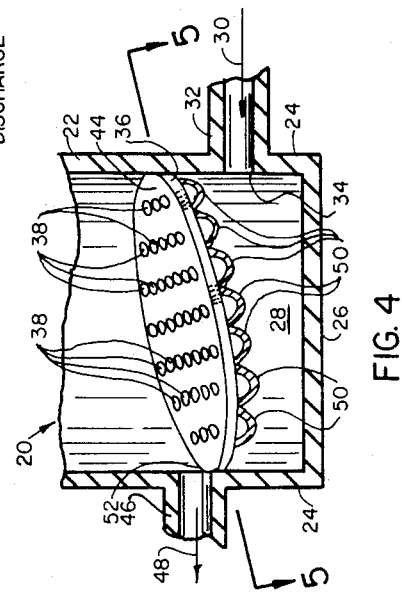
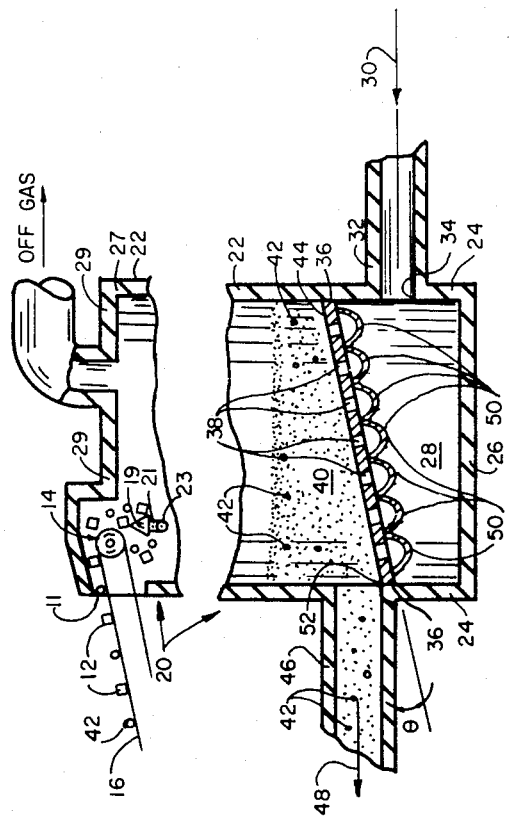

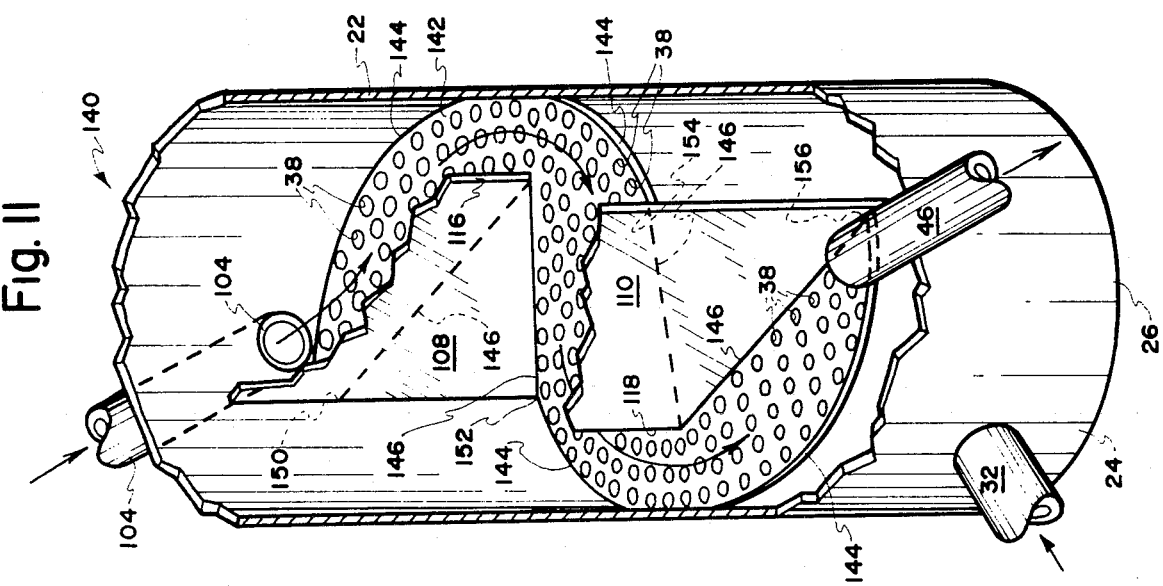
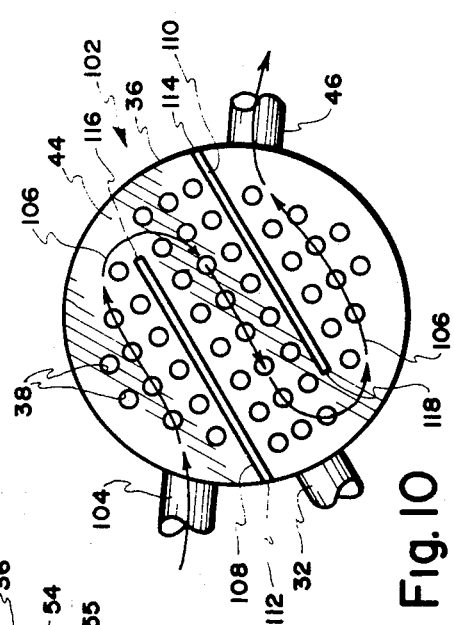
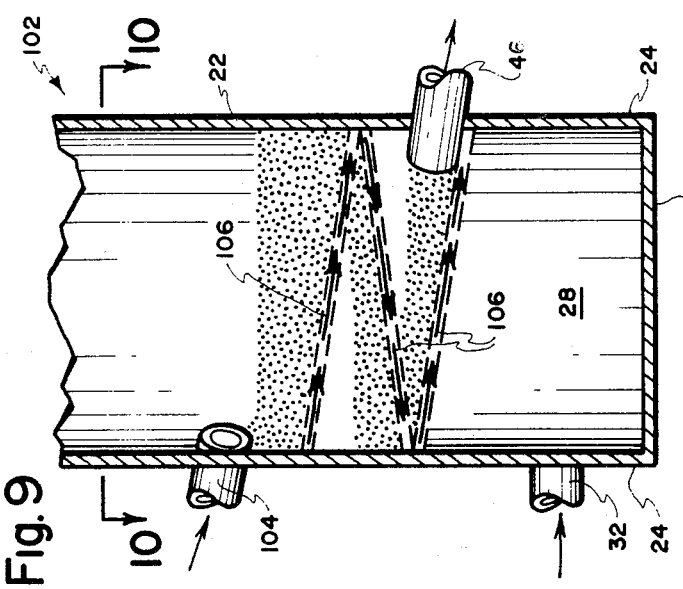
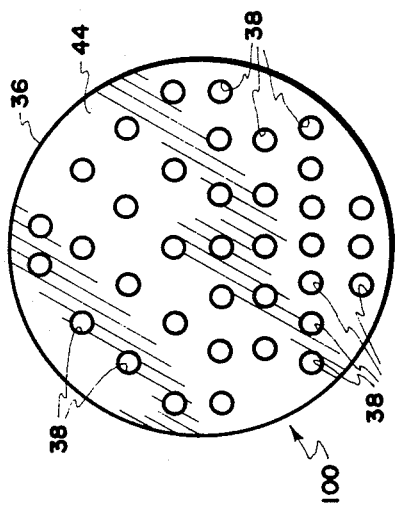
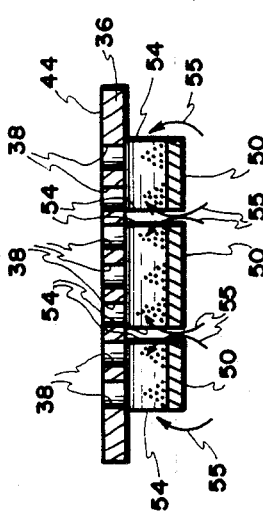

REMOVAL OF TRAMP MATERIAL FROM FLUID BED VESSELS

BACKGROUND

Continuity

This application is a continuation-in-part of copending U.S. patent application Ser. No. 528,815, filed Sept. 2, 1983, now abandoned.

FIELD OF INVENTION

The present invention relates broadly to fluidized bed combustion and pyrolysis and more particularly to a novel system, including method and apparatus, for effectively removing tramp or trash material from the bed material while avoiding certain problems encountered by the prior art.

PRIOR ART

As can be appreciated by reference to U.S. Pat. Nos. 3,834,326; 4,060,041 and 4,075,953, fluidized bed systems typically require, inter alia, a bed vessel, a fluidizing air distribution structure, bed material of predetermined depth, a preheater and an ongoing source of fuel to be incinerated or pyrolized within the bed.

Bed support structure or a grid plate (aka a gas/air distributor) is an important and necessary part of such fluidized bed systems. There are two basic types of bed support structures or grid plates used today. These are illustrated in FIGS. 1 and 2. FIG. 1 illustrates a horizontally disposed grid plate. See U.S. Pat. No. 3,834,326, FIG. 1 of U.S. Pat. No. 4,060,041 and FIG. 1 of U.S. Pat. No. 4,075,953. The plate has a dual function. It supports the bed, and it distributes air throughout the bottom of the bed. When the fluidized bed is used as a combustor, the type of fuel used is ordinarily limited to gases, liquids, or solids, which, when burned, ideally leaves no residue.

Many types of solid materials are used as fuel, but they may and usually do, contain tramp or trash material that does not burn. When solid fuel is used in a fluidized bed combustor having a bed support-air distributor or grid plate, unburned trash or tramp material progressively collects on top of the plate. When too much trash has accumulated on top of the plate, air distribution through the bed becomes poor and combustion efficiency drops. With previously proposed support plate designs, the accumulated tramp material is difficult and sometimes impossible to remove from above the plate in the bed vessel.

FIG. 2 illustrates an air distribution header system, which distributes air in a fluidized bed. See FIGS. 10 and 11 of U.S. Pat. Nos. 4,060,041 and 4,075,953. With it, fluidizing air is distributed into the bed through evenly spaced headers, which run from one side of the vessel to the other. Small air outlet "nozzles" or "distributor caps" are spaced on top of stand pipes projecting upwardly from the headers. Air leaves the nozzles, or caps, and fluidizes the bed above. No fluidization takes place below the outlets of the nozzles or distributor caps.

Sufficient space is left between the headers so that nonfluidizable tramp or trash material comingled with influent solid fuel typically will settle between the headers and the distributor nozzles. At appropriate intervals or continuously, bed material and tramp material are simultaneously discharged from the vessel through a conical section located underneath the headers.

Certain types of large, heavy and/or irregularly-shaped trash objects comingled with the fuel tend to remain lodged in the bed and to clog the openings between the headers. Eventually, this unfluidizable tramp material causes poor bed fluidization and it becomes difficult, if not impossible, to drain the clogged tramp material from the bed without shutting down the system. It has been further proposed in the prior art (i.e. U.S. Pat. No. 4,279,222) that a sloped air diffuser plate be used in a fluidized bed system wherein the flow of fluidizing air is uneven, resulting in circulation of the bed oppositely above and below bed baffles generally around a horizontal axis between non-fluidized quiet zones of the bed and the fluidized region. Additional baffle material structure above the bed baffles the bed in as it circulates to thereby control the path of circulation and to confine the bed material to a predetermined location.

During periods when the system is not in use or during operation when the system malfunctions and fluidization is improper, bed material, due to the force of gravity will flow into the air plenum below the diffuser plate.

Also, in a context where sulfur in coal is to be removed in a vertically fluidized bed using limestone or the like, it has been proposed (in U.S. Pat. Nos. 3,625,164 and 4,419,940) that a traveling grate comprising top and bottom tracks be used. Ash, Ca S, incompletely combusted fuel, tramp, agglomerates and bed material are displaced counter to gravity along the incline of the moving grate to a dump site for a discharge chute. No provision is made to prevent leakage of bed material into the air plenum below the traveling grate.

Furthermore, it has been proposed (in U.S. Pat. No. 4,196,676) that a horizontal fluidized bed grid plate be used in conjunction with diagonally directed diffuser air, the air being displaced at rates so that fluidization is not uniform and the bed and foreign objects are circulated, around a horizontal plane, along two elongated horizontal paths, one above the other. Bed material elutriated above the bed is returned to the bed by secondary air flow. Bed material progressively removed, with foreign objects, from the circulating horizontal bed solely by the force of diffuser air through a downwardly directed chute is said to return to the bed by upward elutriation within the chute. The foreign objects (and any bed media not returned to the circulatory bed) are quenched in a bath 43. The proposal of U.S. Pat. No. 4,273,073, is very similar in respect to non-uniform fluidization and bed circulation, among other things.

In addition, U.S. Pat. No. 3,877,397 proposes use of massive amounts of bed material in a non-fluidized region in conjunction with two fluidized beds, having separate grid plates, each disposed at a very steep angle in respect to the horizontal and where the mass of downstream bed media controls the rate of displacement of bed media and foreign objects as opposed to grid plate angle.

Other proposals exist for use of a sloped air diffuser plate in conjunction with a dynamically circulated fluidized bed which is non-uniformly fluidized. See the publication *Advances in Energy Production,* from the proceedings of the 5th World Energy Engineering Congress, Sept. 14–17, 1982. Here, as in other proposals, the vessel is materially constricted in the vapor space above the fluidized bed so as to form a deflector wall which, in conjunction with secondary air, controls and confines the circulation of the bed.

Serpentine delivery of compacted municipal waste, under force of the compaction of continually influent waste, through the vapor space a non-fluid bed pyrolyzer where pyrolysis is completed on a stepped grating has been proposed in U.S. Pat. No. 4,308,807. The proposal is not comparable to fluid bed operation and where use of bed media along the serpentine path would not work.

BRIEF SUMMARY AND OBJECTS OF THE INVENTION

In brief summary, the present invention provides for removal of tramp or trash material from a single fluidized bed contained within a single vessel used to incinerate or pyrolyze solid fuel without the attending disadvantages of prior fluid bed proposals. In its preferred form, the present invention comprises a gently sloped or skewed bed support and air distributor structure designed to distribute air in a fashion as to uniformly fluidize a shallow bed of variable depth across the slope thereof without circulating the bed, and at the same time cause non-combustible tramp or trash material (e.g. pieces of steel, rocks, clumps, etc.), to be removed from the bed without passing to a location either above or beneath the bed. The angle of slope is strictly controlled and is substantially less than the angle of repose of the bed material. The solid fuel is evenly distributed within the bed and is not compacted into a single mass. The bed support and air distributor structure has no need for bubble caps or stand pipes or nozzles. Therefore, it is not necessary to have projections or interferences upon or against which incombustible material may accumulate or collect.

During periods of non-fluidization and/or non-use, the bed material is kept from falling into the air distribution plenum below the bed support structure by hollow bed containment structure disposed at sites below the bed support structure. Said structure accumulates a limited amount of bed material which creates a clog, thereby preventing further flow of bed material. When use or fluidization is resumed, fluidizing air pneumatically displaces the limited amount of accumulated bed material from said structure to the main body of bed material disposed upon the bed support structure.

The bed support structure is stationary and preferably comprises air distributor holes disposed at right angles to the slope of the bed support structure. The entirety of the bed is fluidized in a uniform and non-circulating manner. Thus, air enters the bed in one or more non-vertical directions. This non-vertical air displacement is controlled to gently aid in walking tramp material downwardly along the top of the bed support structure toward a discharge site. The discharge site is juxtaposed fluidization holes in the grid plate and no mass of bed material downstream of the region of fluidization is required. Although the discharge of fluidized air through the grid plate into the bed may be non-vertical, the horizontal component of said air discharge is immediately dissipated and the bed turbulence or direction of fluidization is essentially vertical. Secondary air is not required for tramp removal.

In one form, the present invention comprises bed path deflecting means attached to the top of a sloped bed support plate. In another presently preferred form, a sloped helical diffusion plate in the lower part of the vessel is provided. This insures sufficient bed dwell time for the fuel to properly incinerate or pyrolyze, while also insuring timely serpentine, removal of tramp material solely by the forces of gravity and fluidization air without turbulent mixing or circulation of the bed, all in such a fashion that proper and uniform bed fluidization is maintained.

The sizing and spacing of air distributor holes may be established in respect to any sloped grid plate in accordance with the present invention so as to provide for proper and uniform fluidization across the bed having non-uniform depth without causing rotational mixing within the bed.

With the foregoing in mind, it is a primary object of the present invention to provide a novel fluidized bed system, including method and apparatus, for removal of tramp or trash material from the bed.

It is a further important object of the invention to provide fluidizing bed structure, and related methods, which gravitationally and efficiently removes tramp material without the disadvantages of the prior art.

It is an additional significant object of the present invention to provide a fluidized bed system which achieves removal of tramp material without requiring that the tramp material pass to a site below or above the bed.

A further dominant object of the present invention is the provision of a novel fluidized bed system which comprises a gently sloped bed support and fluidizing air structure.

An additional important object of the present invention is the provision of a fluidized bed having a variable though shallow depth in which uniform fluidization occurs across the entirety thereof.

An additional paramount object of the present invention is the provision of a novel bed support and air fluidizing structure wherein bed material does not significantly pass to a site below the bed support and air distributor structure or materially downstream of the fluidized portion of the bed during intervals of non-use and/or non-fluidization.

An additional object is the provision of novel gently sloped bed support structure wherein fluidizing air enters the bed in one or more non-vertical directions aiding in gentle walking of tramp material from the bed downwardly along the sloped bed support toward a discharge site while maintaining uniform fluidization solely in an essentially vertical direction.

A further object of the present invention is the provision of sloped bed support structure by which tramp material is removed from the bed solely by the forces of fluidizing air and gravity.

A further object is the provision of structure by which the dwell time of solid fuel particles in the bed is controlled to insure proper incineration or pyrolysis.

It is a further significant object of this invention to provide a novel single vessel fluid bed system having one or more of the following features:

(a) gently sloped or skewed stationary bed support and air fluidization structure which uniformly essentially vertically fluidized the entirety of a shallow bed of variable depth without causing the bed to internally circulate;

(b) capacity to remove non-combustible tramp objects from the bed without passing bed media or the tramp to a site either above or below the bed;

(c) sloped grid plate the angle of which is strictly controlled and is substantially less than the angle of repose of the bed material;

(d) incinerates and/or pyrolyzes solid fuel as independent particles evenly distributed in the bed and not as a single compacted mass;

(e) hollow bed containment structure associated with a grid plate which prevent loss of bed media into the air plenum during periods of non-use and/or non-fluidization;

(f) whereby tramp material is removed solely by the forces of gravity and fluidizing air;

(g) wherein the bed fluidization is essentially vertical at all times and tramp objects are gently walked down a sloped air diffuser plate solely by the forces of gravity and fluidizing air;

(h) wherein bed deflecting means and/or circuitous diffuser plate means are used;

(i) wherein the bed is shallow and use of a mass of bed material downstream of the fluidized site is avoided;

(j) wherein the sizing and spacing of air distributor holes is non uniform to achieve uniform fluidization in a bed of variable depth; and (k) wherein fluidization and tramp removal occur without internal circulation of bed particles within the bed.

These and other objects and features of the present invention will be apparent from the detailed description taken with reference to the accompanying drawings.

BRIEF DESCRIPTION OF THE DRAWINGS

FIG. 1 illustrates in diagrammatic and fragmentary cross section a fluidized bed system in accordance with the prior art which utilizes a grid plate;

FIG. 2 is a diagrammatic fragmentary cross section of another prior art fluidized bed system, which utilizes a plurality of air distribution headers and nozzles accommodating removal of tramp material from a lower conical section after it passes downwardly between the nozzles and the headers;

FIG. 3 is a fragmentary cross section of a first presently preferred embodiment of the present invention;

FIG. 4 is a fragmentary cross section partly in perspective which illustrates a grid plate similar to the embodiment of FIG. 3 with the bed material removal therefrom;

FIG. 7 is a cross sectional view taken along lines 7—7 of FIG. 6;

FIG. 8 is another presently preferred embodiment of the present invention illustrating a grid plate having a variable non-uniform array of fluidizing air apertures contained therein;

FIG. 9 is an enlarged fragmentary cross sectional view of a further presently preferred embodiment of the present invention;

FIG. 10 is a plan view taken along lines 10—10 of FIG. 9;

FIG. 11 is a fragmentary perspective representation of still another presently preferred embodiment in accordance with the present invention.

DETAILED DESCRIPTION OF THE ILLUSTRATED EMBODIMENTS

Figure 5:
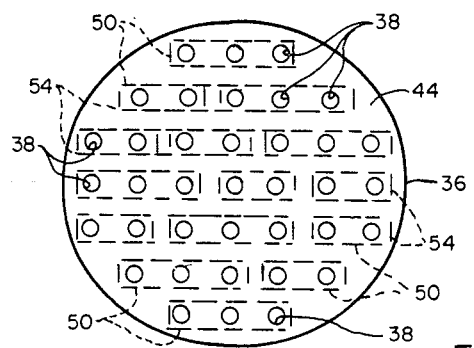
FIG. 5 is a cross section of the grid plate taken along lines 5—5 of FIG. 4.

Specific reference is now made to the drawings in detail wherein like numerals are used to designate like parts throughout. FIGS. 1 and 2, as previously indicated, refer to prior art proposals by which the bed material is retained in the bed vessel and fluidizing air delivered to the bed, with FIG. 2 further showing structure by which tramp and bed material are removed from the vessel.

FIG. 3 illustrates in fragmentary vertical cross section (somewhat in schematic form) a presently preferred fluidized bed apparatus, generally designated 20. Apparatus 20 comprises a generally cylindrical single vessel 22 formed of suitable steel or refractory lined steel having characteristics adequate to resist the temperatures and abrasive environment existing in the interior thereof during use. The vertically erect cylindrical vessel 22 comprises a lower end 24 which is closed by a horizontal disc shaped bottom plate 26 and an upper end 27 comprising a top plate 29.

The interior of the vessel immediately above the bottom 26 consitutes a plenum or wind box 28 into which fluidizing air is introduced from a conventional source (not shown) in the direction of arrow 30 through air influent conduit 32 which comprises an opening 34 into the plenum or windbox 28.

The top of the windbox 28 is defined by disc shaped grid or diffuser plate 36 of uniform thickness throughout which is preferably fastened in an airtight manner at its circumference to the vessel 22. A stationary disc shaped grid plate 36 is disposed at an acute angle $\theta$ in respect to the horizontal. Plate 36 has no moving parts. This angle is determined by the particular type of tramp material to be removed from the bed as well as the type of bed material used. However, the present invention is directed toward uniform fluidization of a bed having a variable depth due to the sloped grid plate. To achieve the mentioned uniform fluidization without internal bed circulation, the angle of slope must be strictly controlled and must be substantially less than the angle of repose of the bed material being used. In this connection it has been discovered that a gentle slope ($\theta$) within the range of 5° and 15° is effective in the removal of bed and tramp material in accordance with and based upon the principles of the present invention, as herein annunciated.

The grid plate 36 comprises no bubble caps or tuyeres or nozzles. Therefore, there are no projections for incombustible material to accumulate or collect. Grid plate 36 comprises a plurality of apertures 38 through which fluidizing air is caused to pass into the bed from the windbox 28. The apertures 38 are sized, located and preferably non-vertically disposed so as to provide uniform essentially vertical fluidization to a single shallow fluid bed 40, formed of suitable inert granular material, as hereinafter more fully explained. The bed maintains a horizontal top surface, so the bed depth range is simply that resulting from the angle of the distributor plate and the diameter of the vessel. A bed depth at the upper edge of on the order of 18 inches is appropriate for most application. Thus, for example, a 6 foot diameter bed with a 10° sloped plate would have an 18 inch deep bed on the shallow side and a 31 inch deep bed on the deep side.

Separate particles of fuel 12 are introduced into the vessel 22 continuously or continually in any one of several ways known to be conventional in the art. Apparatus is provided for continually delivering fuel, which may comprise pieces of solid waste 42 to the incineration or pyrolysis fluid bed vessel 22. See FIG. 3. Thereafter, the pieces of solid waste 42 are caused to become somewhat homogeneously distributed within a fluidized bed 40 disposed near the bottom of an incineration vessel 26. While any conveyance may be used to so deposit the solid waste pieces 42 within the fluidized bed 40, including the direct injection of the pieces into the bed, a box conveyor 14 is illustrated in FIG. 3. The leading or top end of the conveyor extends into the vessel 22 at elevated opening 11. Conveyor 14 comprises a conveyor belt 16 conventionally driven and displaced around a roller 17 whereby the solid waste pieces 42 fall into the vessel and are distributed by an impact cone 19 which is mounted on a support 21 and is in turn supported by a cross member 23. Mechanisms may be used in conjunction with the box conveyor 14 to meter the rate at which solid waste pieces are fed into the vessel. As a consequence, the pieces of solid waste 42, which, by way of example, may comprise wood waste and like stock refuge, are caused to be evenly distributed and embedded within the fluidized bed 40.

Depending upon the particular material and circumstances, pieces of solid waste 42 may be pre-dried before being fed into the incinerator, or water may be added thereto prior to or simultaneously with displacement into the incinerator. In any event, said pieces are subject to high temperature combustion or pyrolysis, with or without carbonaceous residue, depending upon operating temperature, oxygen available and mode of operation.

In the course of fuel introduction, non-combustible tramp material 42, e.g. rocks, steel objects, etc., is also typically and inherently introduced with the fuel particles 12 and caused thereafter to be embedded within the fluid bed 40. Due to the weight of the particles 42 of tramp material, they are caused by the action of the fluidizing air and the force of gravity to move progressively in a downward direction until contact is made with the upper surface 44 of the gently sloped grid plate 36. Thereafter, the force of gravity in conjunction with the fluidizing air alone causes the tramp particles 42 to walk slowly downwardly along the top surface 44 of the plate 36 and to be progressively discharged along with bed material through bed and tramp removal discharge conduit 46 in the direction of arrow 48.

Thus, the removal of tramp is solely by the force of gravity and fluidizing air without internal circulation of the bed while maintaining uniform vertical fluidization of the bed across the entire cross section of the bed. At no time is the tramp material passed to a location above or below the bed, while in the vessel.

The discharge site 52 is juxtaposed fluidization holes in the grid plate 36 and no mass of bed material downstream of the region of fluidization is required. Although the discharge of fluidized air through the grid plate into the bed is preferably non-vertical, the horizontal component of said air discharge is immediately dissipated and the bed turbulence or direction of fluidization is, therefore, essentially vertical.

The grid plate 36 is preferably fastened in an airtight manner into the illustrated position so that the lowest point 52 of the top surface 44 of the plate 36 is flush with the low point of the interior of the discharge conduit 46. Typically, as explained hereinafter in greater detail, the discharged bed material is reclaimed after being segregated from the discharge tramp material, at which time the discharged tramp material is discarded.

During fluidization, even though the size of the granular particles forming the bed 40 and the size of some of the tramp material particles 42 may have a transverse dimension less than the diameter of the plate apertures 38, none of the bed or tramp material particles will pass through the grid plate 36 due to the force of fluidizing air passing upwardly therethrough into the bed 40.

During periods of non-use and/or non-fluidization, the bed material is kept from falling into the plenum 28 by use of bed containment structure which are illustrated as being in the form of half sections of steel pipe 50. The half sections of pipe 50 are preferably welded at their edges to the underside of the plate 36 directly under one or more gas distributor apertures 38. When no fluidizing air is being passed through the grid plate 36, a very limited amount of bed material falls into each half section of pipe 50 beneath the plate 36. A small pile of bed material thus accumulates beneath each hole in the associated half section of pipe 50 and serves after a brief period of time to clog each associated aperture 38 to prevent further flow of bed material. The amount of material accumulated in each half section pipe 50 depends upon the size of the apertures and the angle of repose of the bed material. No bed material falls into the plenum or windbox 28.

When air is again admitted into the plenum and fluidization undertaken, the air passes through the open ends 54 (FIG. 7) of each pipe section 50 in opposite directions as denoted by arrows 55. This air pneumatically sweeps the accumulated bed particles through the associated aperture or apertures 38 back into the bed 40.

Because the air distributor apertures 38 in the illustrated embodiments are disposed at right angles to the grid plate 36, air enters the bed in one or more non-vertical directions. Air entering the bed in such non-vertical directions is controlled to enhance the slow migration of the tramp material downwardly along the top surface 44 of the grid plate 36 to the lower site 52 where discharge from the vessel 22 occurs, as previously mentioned. The degree to which the air enters the bed in one or more non-vertical directions is directly related to the slope angle $\theta$ of the plate. Secondary air is not required for tramp removal.

It should be noted, with reference to FIG. 4, that the disposition of plate 36 is illustrated as being skewed (i.e. disposed at acute angles in respect to a horizontal plane and two vertical planes each perpendicular with the horizontal plane and perpendicular to each other). Use of a skewed distributor plate provides for a longer dwell time for fuel particles incinerated or pyrolyzed within the bed 40. The dwell time of fuel particles 12 in the bed 40 may be controlled by controlling the rate and points in time when bed material and tramp material are caused to be discharged from the vessel 22 through discharge conduit 46.

Figure 6:
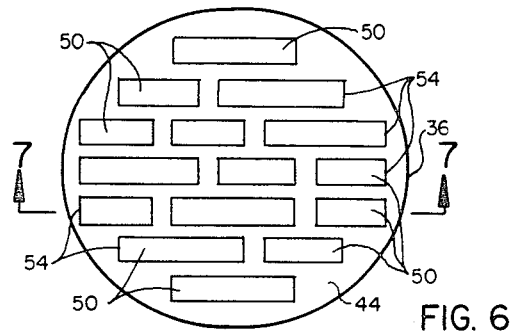
FIG. 6 is a bottom plan view of the grid plate of FIG. 4.

As can be seen by observance of FIGS. 5–7, the half section pipes 50 may be of various lengths selected to be disposed beneath the grid plate 36 so as to cover at least one and preferably two or three of the grid apertures 38. Preferably the bed containment half section pipes 50 are butt welded to the lower surface of the grid plate 36, as illustrated.

It should be readily apparent, with reference to presently preferred embodiment 100 (illustrated in FIG. 8), that in some applications a uniform spacing of air distribution apertures 38 in the grid plate 36 may not be sufficient to promote uniform fluidization of the bed 40. Accordingly, variations may be made in the size and arrangement of the apertures 38 so as to promote uniform fluidization of the entire bed.

Ordinarily, depending upon the bed material being used and the fuel and tramp material being fed into the vessel 22, it is preferable to have a higher density of apertures in the lower portion of the grid plate 36 as opposed to the more elevated portion of the grid plate. An array of apertures consistent with the principles of the present invention, which provides a more dense hole spacing toward the bottom of the incline which gives the same vertical air velocity through the deeper portion of the bed as occurs in the shallower portion of the bed, is illustrated in FIG. 8. In other words, the variation in fluidizing aperture density provides uniform vertical air flow across the entirety of the bed, which has a variable depth. Other variations in the aperture array can be utilized, it being a requirement of the present invention that a pressure drop through the grid plate 36 of at least 30% of pressure drop through the bed 40 be achieved by air distributed through each aperture 38 of the grid plate 44. Any distribution of holes 38, properly sized and arranged of a low density at the high side of the plate to a high density at the low side of the plate may be utilized which achieves the mentioned pressure drop and uniform bed fluidization.

When using a flat distributor plate, the distributor plate pressure, as mentioned, drop for uniform fluidization is about Δ that of the bed pressure drop. For a sloped plate the Δ factor applies to the deepest part of the bed. Therefore, the plate pressure drop on the shallow side must be greater to keep the air from preferentially going through that part of the bed. The desired pressure drop, which varies with bed depth, can be obtained by either a small number of large holes, or a large number of small holes in the region where the bed is deepest.

Thus, in the six foot bed example, the flat distributor must have a 0.55 psi pressure drop on the deep side and a 1.02 psi drop on the shallow side. If 3/16 inch diameter holes are used, the hole "density" would be 244 holes/ft$^2$ on the deep side and progress to 180 holes/ft$^2$ on the shallow side. Similarly, if ¼ inch diameter holes are used throughout, the hole density ranges from 137 holes/ft$^2$ to 101 holes/ft$^2$.

A further presently preferred embodiment in accordance with the present invention is illustrated in FIGS. 9 and 10 and is generally designated 102. The illustrations of FIGS. 9 and 10 are somewhat exaggerated in length and slope for purposes of visual clarity. Fluidized bed system 102 is identical in most major respects to fluidized bed system 20 already described and identical parts have been labeled identically to avoid presentation of duplicative descriptive information. Fluidized bed system 102 comprises the air influent duct 32 which delivers air under pressure to the plenum or windbox 28, the bed and tramp material discharge duct 32 as well as an influent duct 104 by which new and/or reclaimed bed material is introduced. Fuel is introduced on a controlled or metered basis.

The system 102 also comprises the previously described sloped grid plate 36 having an essentially uniform array of fluidizing air apertures 38 perpendicularly disposed therein. The grid plate 36 (not illustrated in FIG. 9), is disposed at a gentle acute angle in respect to the horizontal. The location and slope of the plate 36 is such that bed and tramp material entering the vessel 22 at influent conduit 104 is caused to flow solely by forces of gravity and fluidizing air from bed material influent 104 downwardly along the serpentine flow path 106 (FIGS. 9 and 10) to discharge duct 46. The mentioned serpentine bed material displacement along flow path 106 is enhanced by the presence of two bed path deflecting upright baffle plates 108 and 110, which are respectively welded to the top surface 44 of the plate 36 at an edge thereof so as to project a substantial distance in a generally vertical direction. The height of the baffle plates 108 and 110 is selected so as to be a function of bed and tramp material over the top of either baffle. Baffle 108 is contiguous at edge 112 with and preferably welded to the vessel, as is edge 114 of baffle 110.

Baffle ends 116 and 118 are spaced from the wall of the vessel 22 and accommodate the described serpentine flow of bed material containing tramp. In this way, a uniform array of apertures is satisfactory and the top surface of the bed may be sloped at an angle to the horizontal requiring minimal custom design of the grid plate to achieve proper uniform bed fluidization.

In addition, utilization of the baffles 108 and 110 materially increase the dwell time for particles of fuel 12 being incinerated or pyrolyzed in the bed so that such fuel is adequately oxidized prior to reaching the discharge duct 46.

Reference is now made to FIG. 11, which illustrates a further presently preferred fluidized bed system embodiment in accordance with the present invention, which is generally designated 140. Since some of the parts of system 140 are substantially identical to components of previously described systems 20 and 102, those components have been given numerals identical to the numerals used in conjunction with the prior detailed description of the systems 20 and 102 and no further description of those components is deemed needed.

System 140 comprises a serpentine shaped grid or air diffusion plate 142 located in the lower part of the vessel 22 and having an outside edge 144 contiguous with and fastened to the interior surface of the steel vessel 22. Serpentine grid plate 142 also comprises heretofore described fluidizing air apertures 38. Grid plate 144 also comprises several interior edges 146 which are contiguous with and fastened to one side or the other of one or the other of a pair of vertically directed upper and lower baffle plates 108 and 110. It should be apparent that there are four linear edges 146, each sloped baffle plate 108 being contiguous at the bottom of the plate with two such edges 146. The two edges 146 of baffle plate 108 runs from an elevation at site 150 adjacent the bed material influent conduit 104 through a 180° turn to site 152. Similarly, baffle plate 110 contiguously receives two plate edges 146 which run downwardly through a 180° turn in a continuous fashion from site 154 to site 156. It should be apparent from observation of FIG. 11 that site 150 has an elevation higher than site 152, which has an elevation higher than site 154 which has an elevation above site 156. Site 156 is directly adjacent the intake opening to bed and tramp material effluent conduit 46. By controlling the slope of serpentine plate 142 and the rate and frequency of which bed material is introduced at conduit 104 and tramp material and bed material are discharged at conduit 46, the dwell time of the bed material, tramp material and fuel within the vessel 22 is controlled to produce continuous and proper fluidization of the bed as well as satisfactory fuel incineration or pyrolysis. And it should be appreciated that the bed loss structure shown in FIG. 7 applies equally as well to the grid plate embodiment of FIG. 11.

Figure 12:
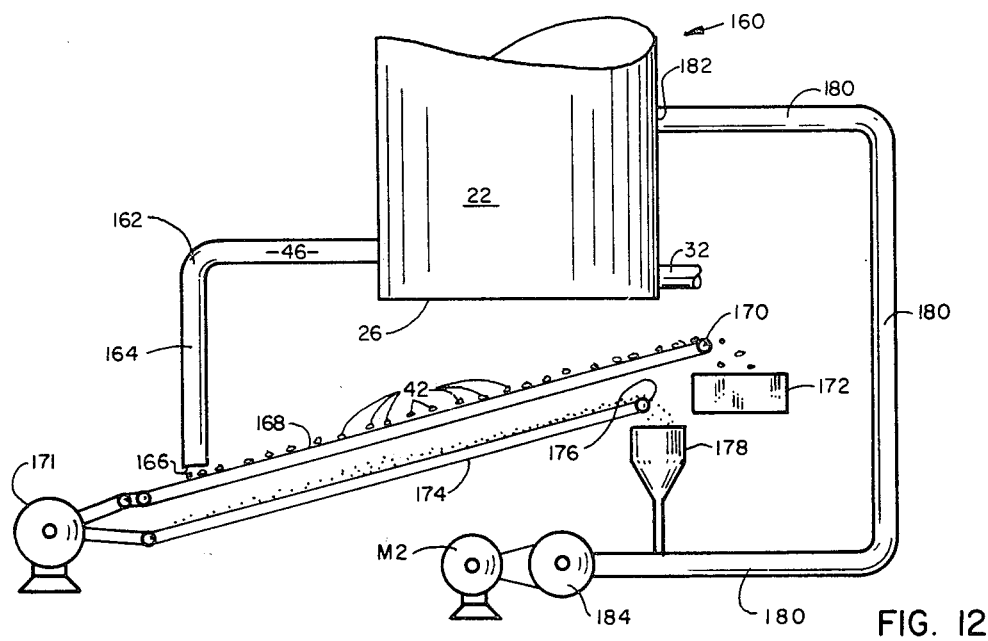
FIG. 12 is a fragmentary side elevation of a presently preferred embodiment for separating bed and tramp materials which are removed from the vessel and returning the segregated bed material to the vessel.

As mentioned earlier, the granular bed material and tramp material which walks or migrates into discharge duct 46 is segregated. FIG. 12 illustrates presently preferred embodiment, generally designated 160, which segregates the tramp from the discharged bed material, discards the tramp and recycles or returns the bed material to the vessel 22. Discharged tramp and bed material, in respect to FIG. 12, pass from discharge duct 46 around elbow 162, along duct 164 and vertically out the exposed discharge end 166 of duct 164. Thus, the tramp and bed material are discharged vertically onto a vibrating screen conveyor 168, which is driven by motor M1 so as to oscillate. The screen conveyor 168 separates reusable bed material from tramp material with the tramp material proceeding up the conveyor 168, off the elevated end 170 and discarded into a portable refuge container 172. The reusable bed material passes through the mesh of the conveyor 168 onto a lower conveyor 174 and is discharged from the elevated end 176 thereof into a bed material storage bin 178 into a bed material return conduit 180 along which the return bed materially is displaced and ultimately out effluent end 182 thereof onto the fluidized bed 40 within the vessel 22 under force of blower 184 driven by motor M2. Thus, tramp material is removed and the bed material is continuously or intermittently recirculated for reuse. The bin 178 also provides a convenient point for the addition of new "makeup" bed material which is required from time to time during normal operation of the fluid bed system, due to particle elutriation and attrition caused by particle fracture and abrasive wear. In this way, the bed inventory is maintained at the optimum level for proper uniform fluidization.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluidized bed system comprising:
   a vessel;
   stationary flat sloped grid plate means comprising an array of fluidizing apertures disposed in and peripherally connected to the lower portion of the vessel;
   a shallow fluid bed resting entirely on the plate means and comprising a variable depth transversely across the vessel, the bed being formed of inert granular material;
   means by which fuel particles, containing non-combustible tramp objects, are delivered to the interior of the vessel and to the fluid bed therein;
   a source of fluidizing air;
   means by which influent fluidizing air is delivered to a site within the vessel below the plate means and the fluid bed;
   means at a first elevation above the highest plate means elevation by which influent bed material is delivered to the vessel and the fluid bed within the vessel;
   effluent means at a second elevation immediately above the lowest plate means elevation by which effluent bed material and tramp objects exit the fluid bed and the vessel after migrating downwardly along the plate means;
   the stationary sloped grid plate means being angularly disposed between the fluid bed and the influent fluidizing air site within the vessel by which the entirety of the bed is uniformly fluidized without internal rotational circulation of the bed while retaining the surface of the bed essentially level, the tramp objects being walked downwardly along the top of the stationary sloped grid plate means to the effluent means solely by gravity and fluidizing air and bed material being prevented from passing through the sloped plate means during both periods of fluidization and non-fluidization.

2. A fluidizing bed system comprising a vessel comprising bed support and fluidizing air distributor structure comprising a relatively flat plate with fluidizing apertures therein and upon which the entire weight of a fluid bed rests, the plate being angularly disposed with respect to the horizontal, at an angle less than the angle of repose of the bed material, the plate being situated within and connected to the vessel whereby fluidizing air is introduced into the bed through said apertures and fuel particles, bed material and tramp material are introduced into the vessel and gravitationally migrate downwardly, bed and tramp materials being selectively discharged from the vessel at a discharge site located above said plate, the system further comprising means below the plate which substantially retain the bed material within the bed above the plate against flow loss thereof through said apertures during times when the bed is not being fluidized.

3. A fluidized bed system according to claim 2 further comprising bed deflector means connected to the plate and projecting upwardly into the bed imparting a circuitous displacement along the top of the air distributor structure to the migration of the bed and tramp materials to the discharge site thereby increasing the dwell time of fuel particles within the bed.

4. A fluidized bed system according to claim 2 wherein the bed support plate, fluidizing air distributor structure and the fluid bed are serpentine in their respective configurations and the fluidization apertures in the plate comprise an array along substantially the entirety of the serpentine plate with the serpentine air distributor structure supplying air to all of the apertures of the serpentine array.

5. A fluidized bed system according to claim 2 wherein the fluidizing air passes through the apertures in the plate in one or more non-vertical directions to augment the gravitational migration of the tramp materials downwardly along the plate toward the discharge site, whereby the fluidization of the bed is uniform and substantially vertical, the non-vertical component of the fluidizing air being essentially dissipated in gently displacing the tramp material down the plate.

6. A fluidized bed system according to claim 2 wherein the apertures in the plate are sized, spaced and distributed to produce at any location within the bed a pressure drop through the apertures of at least 30% of the pressure drop through the bed.

7. A fluidized bed system according to claim 2 wherein the below the plate means comprise bed material catch and collector means carried by and disposed below the plate directly below and juxtaposed each fluidizing aperture into which a very small amount of bed material flows and accumulates immediately upon non-fluidization to thereby promptly clog to prevent further flow and loss of bed material through said fluidizing apertures, the below the plate means further comprising air passageway means by which the bed material earlier clogged in each catch and collector means is returned through the fluidizing apertures to the bed per se under force of fluidizing air upon resumption of fluidization.

8. A fluidizing bed system according to claim 7 wherein the below the plate means collectively comprise a plurality of sections each having a hollow interior exposed to at least one fluidizing aperture, each section being secured to the underside of the plate, and comprising wall means directly and closely juxtaposed each fluidizing aperture.

9. A fluid bed system comprising a single vessel fluidizing air distributor structure comprising helical fluid bed supporting sloped plate means having an upper end and a lower end, with an array of fluidizing apertures disposed in the plate means, the fluidizing air distributor structure and plate means being disposed in the lower part of the vessel, a fluid bed superimposed upon the serpentine sloped plate means and uniformly fluidized, without causing bed circulation, transversely across the entirety of the bed by fluidizing air passing under force through said apertures in the plate means, the helical sloped plate means being connected to the vessel such that the entire bed within the vessel rests thereon, whereby fuel particles, bed material and tramp objects introduced into the vessel gravitationally and pneumatically migrate downwardly along a serpentine flow path, without loss of bed fluidization, as the fuel particles are oxidized within the bed, to and bed material and tramp objects are selectively discharged from the vessel at a discharge site located above the lower end of the helical sloped plate means.

10. A system according to claim 9 further comprising means located below the plate means adjacent each aperture which substantially prevents loss of the bed material from the bed, through the helical sloped plate means during times when the bed is not being fluidized.

* * * * *